(12) United States Patent
Ivan et al.

(10) Patent No.: US 7,516,155 B2
(45) Date of Patent: Apr. 7, 2009

(54) METHOD TO VALIDATE CONSISTENCY OF COMPONENT BUSINESS MODEL MAPS

(75) Inventors: Anca-Andreea Ivan, New Rochelle, NY (US); Juhnyoung Lee, Yorktown Heights, NY (US); Yue Pan, Beijing (CN); Guo Tong Xie, Beijing (CN); Yang Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 11/434,282

(22) Filed: May 16, 2006

(65) Prior Publication Data

US 2007/0271277 A1 Nov. 22, 2007

(51) Int. Cl.
*G06F 7/00* (2006.01)
*G06F 17/00* (2006.01)
(52) U.S. Cl. .................................... 707/102; 717/100
(58) Field of Classification Search .................. 707/102; 717/100
See application file for complete search history.

(56) References Cited

U.S. PATENT DOCUMENTS

| 6,789,252 B1* | 9/2004 | Burke et al. ................. 717/100 |
| 2006/0229926 A1* | 10/2006 | Homann et al. ................. 705/9 |
| 2007/0118551 A1* | 5/2007 | Akkiraju et al. ............. 707/102 |

* cited by examiner

*Primary Examiner*—James K. Trujillo
*Assistant Examiner*—Jeffrey Chang
(74) *Attorney, Agent, or Firm*—Whitham, Curtis, Christofferson & Cook, PC; Derek S. Jennings

(57) ABSTRACT

A method is described for using descriptive logic (DL) representations to validate consistency in component business model (CBM) maps. Semantic constraints are generated from a semantic model of a component business model meta-model and inconsistency conditions of CBM maps. The semantic model of the CBM meta-model is applied to transform CBM maps into corresponding semantic representations. An inference engine applies the semantic constraints to the semantic representations to determine inconsistencies between one CBM map and another and between a CBM map and the component business model meta-model.

1 Claim, 8 Drawing Sheets

METHOD TO VALIDATE CONSISTENCY OF COMPONENT BUSINESS MODEL MAPS

This invention is related to commonly owned U.S. patent application Ser. No. 11/176,371 for "SYSTEM AND METHOD FOR ALIGNMENT OF AN ENTERPRISE TO A COMPONENT BUSINESS MODEL" which is incorporated by reference herein.

BACKGROUND OF THE INVENTION

1. Field of the Invention

The present invention generally relates to component based business models and, more particularly, to a system and method for deducing and resolving potential inconsistencies in the semantic representation of component business model maps.

2. Background Description

Component Business Modeling is a state-of-art technology for modeling the entire enterprise from a business perspective, driving information technology (IT) solutions to help transform an enterprise from a current AS-IS condition to a desired TO-BE condition. The component business model (CBM) map is the key component in CBM methodology and CBM related tools. Component business modeling is a technique for modeling businesses based on a number of non-overlapping "business components," which are defined as relatively independent collections of business activities. It provides simple business views for analysis, unlike traditional business process-based models which provide transactional views of businesses. The CBM methodology facilitates qualitative analysis techniques such as the dependency analysis (to identify "hot" components associated with business pain points), the heat map analysis (also to identify "hot" components associated with business pain points), and the overlay analysis (to identify IT shortfalls of the "hot" components).

The CBM-based qualitative business analysis has been mostly conducted manually by business consultants. What is needed for automation of the CBM-based business analyses is a semantic representation of the component business model. In particular, there is a need to validate the CBM models by detecting inconsistencies 1) among the various CBM maps (that is, the universal CBM map at the broadest level, the intermediate level industry CBM maps, and the CBM maps for particular enterprises) and 2) between the CBM meta-model and a CBM map.

Some examples of inconsistency are as follows. Suppose the demand forecast and analysis component belongs to the marketing competency in the CBM map for the retail industry. But a consultant working on a CBM map for an enterprise within the retail industry may assign the demand forecast and analysis component to a different competency, say, financial management. Then the enterprise map is inconsistent with the retail industry map, but the consultant has no systematic methodology for identifying this kind of inconsistency.

Another simple example would be the cardinality inconsistency. For instance, the CBM meta-model specifies that a component has one and only one accountability level. When working on a CBM map, a consultant may give a component more than one accountability level. This is not correct and will complicate further analysis, but the consultant may not be aware of the inconsistency because of the large number of components, activities or services in one CBM map.

Inconsistencies in CBM maps will set traps that will compromise the efficiency of further CBM related consulting. The manual validation of CBM models and maps in order to avoid these inconsistencies is a tedious and error-prone process, causing significant degradation of productivity and accuracy of the CBM-based analysis. Therefore, some methods or tools should be developed to detect those inconsistencies as early as possible.

SUMMARY OF THE INVENTION

One aspect of the invention is a method for automating the validation of consistency of component business models, comprising generating semantic constraints from i) a semantic model of a component business model meta-model and ii) inconsistency conditions applicable to at least one component business model (CBM) maps, using the semantic model to transform the CBM maps into corresponding semantic representations, and applying the semantic constraints to the semantic representations to determine inconsistencies between the component business model meta-model and one of the CBM maps. In this aspect of the invention it is preferred that the component business model be comprised of non-overlapping components arranged by accountability level within non-overlapping managing concepts, wherein one of the CBM maps is a map of a business enterprise, and one of the CBM maps is a map of the industry in which the business enterprise operates.

In another aspect, the method of the invention applies the semantic constraints to the semantic representations to determine inconsistencies between the enterprise CBM map and the industry CBM map. A further aspect of the invention's method is using a CBM tool to modify the CBM enterprise map to remove the inconsistencies. It is also an aspect of the invention to provide a service for validating the consistency of CBM maps by using the method of the invention.

It is also an aspect of the invention to provide a method for automating the validation of consistency of component business models, the method employing a component business model representation of a business enterprise, and further comprising a component business model meta-model and at least one CBM maps of non-overlapping components arranged by accountability level within non-overlapping managing concepts, one of the at least one CBM maps being a map of the business enterprise, the system further being comprised of a generator for generating semantic constraints from i) a semantic model of the component business model meta-model and ii) inconsistency conditions applicable to the at least one CBM maps, the system further being comprised of a transformer for using the semantic model to transform the CBM maps into corresponding semantic representations, the system further being comprised of an inference engine for applying the semantic constraints to the semantic representations to determine inconsistencies between the CBM meta-model and one of the CBM maps.

In another of its aspects, the method of the invention provides that the semantic representation of the industry CBM map is a first ABox and the semantic representation of the enterprise CBM map is a second ABox, and the inference engine determines inconsistencies by performing a self-consistency validation on a third ABox, the third ABox being a combination of the first ABox and the second Abox. In a further aspect of the invention the component business model meta-model is a TBox, and the inference engine determines inconsistencies by verifying whether the first ABox complies with the TBox and whether the second ABox complies with the TBox. In yet another aspect, one of the CBM maps is a universal CBM map, and the semantic representation of the universal CBM map is a fourth ABox A4. It is also an aspect of the method of the invention for the inference engine to determine inconsistencies between the enterprise map and the industry map and the universal map by performing a self-consistency validation of a fifth ABox A5, the fifth ABox being the combination A1+A2+A4.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
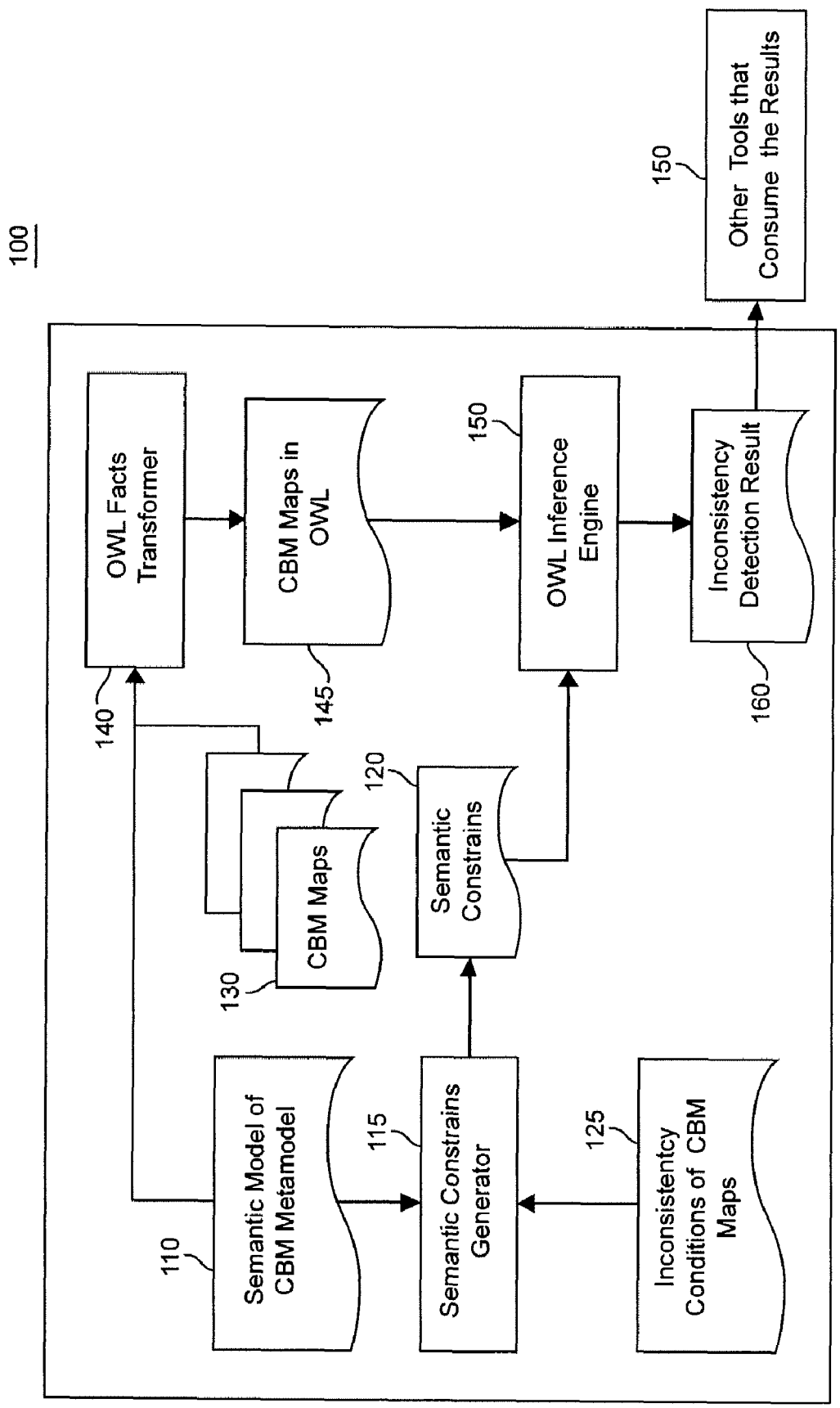
FIG. 1 is a flow chart showing how the overall logic of the inconsistency detection process.

It is therefore a feature of the present invention to provide systematic identification of inconsistencies in CBM maps.

Another feature of the invention is automation of identification of inconsistencies in CBM maps.

A further feature of the invention is to provide a method of validating consistency of CBM maps.

It is also a feature of the invention to provide tools for early detection of inconsistencies in CBM maps.

The present invention is a novel approach to detecting inconsistencies in CBM maps based on semantic technologies. The invention provides a semantic business model that uses a semantic markup language to describe the CBM maps and the CBM meta-model. For the purpose of illustrating the invention the OWL markup language is used, but one skilled in the art will appreciate that the same methodology can be used in other semantic markup languages such as W3C and RDF.

Analysis of CBM maps using the semantic business model discovers implicit facts in the analyses by using inference capabilities of ontology by capturing relationships of relevant concepts such as business components, business processes, business activities, operational metrics, performance indicators, value drivers, IT applications, IT capabilities (systems, services, solutions, and the like), and resources including human resources. A detailed structure of the semantic business model is captured in the CBM meta-model.

The invention uses the Component Business Model (CBM) described in related patent application Ser. No. 11/176,371 for "SYSTEM AND METHOD FOR ALIGNMENT OF AN ENTERPRISE TO A COMPONENT BUSINESS MODEL" (hereafter termed "the above referenced foundation patent application"). CBM provides a logical and comprehensive view of the enterprise, in terms that cut across commercial enterprises in general and industries in particular. Typically, CBM presents business information in the form of CBM maps at a universal level (cutting across all industries), at an industry level (cutting across all business within an industry) and at the level of a particular enterprise within an industry. In principle, a map at a lower level is a subset of, and therefore consistent with, a map at a higher level.

The component business model as described in the above referenced foundation patent application is based upon a logical partitioning of business activities into non-overlapping managing concepts, each managing concept being active at the three levels of management accountability: providing direction to the business, controlling how the business operates, and executing the operations of the business. The term "managing concept" is specially defined as described in the above referenced foundation patent application, and is not literally a "managing concept" as that phrase would be understood in the art. For the purpose of the present invention, as for the related invention, "managing concept" is the term associated with the following aspects of the partitioning methodology. First, the methodology is a partitioning methodology. The idea is to begin with a whole and partition the whole into necessarily non-overlapping parts. Second, experience has shown that the partitioning process works best when addressed to an asset of the business. The asset can be further described by attributes. Third, the managing concept must include mechanisms for doing something commercially useful with the asset. For a sensibly defined managing concept these mechanisms must cover the full range of management accountability levels (i.e. direct, control and execute). Managing concepts are further partitioned into components, which are cohesive groups of activities. The boundaries of a component usually fall within a single management accountability level. It is important to emphasize that the boundaries between managing concepts (and between components within managing concepts) are logical rather than physical.

In order to detect inconsistencies in CBM maps, our approach is to represent consistency conditions of CBM maps in Web Ontology Language (OWL), and use the OWL inference engine to deduce the potential inconsistencies of the semantic CBM representation of CBM maps. This approach operates in the following manner:

The CBM meta-model is represented in OWL.

Consistency conditions are represented as further constraints, which can be OWL expressions or OWL rule expressions, on the semantic CBM meta-model. The base semantic CBM meta-model and further constraints form semantic constraints on CBM maps.

An OWL inference engine takes the CBM meta-model with consistency constraints as one input, and instance CBM maps as another input, then deduces potential inconsistencies between one CBM map and another CBM map or between CBM maps and the CBM meta-model after a reasoning process.

OWL is based on a Description Logic (DL). In general, a knowledge base expressed in a DL is constituted by two components. The first component stores a set of universally quantified assertions stating general properties of concepts and roles. The second component comprises assertions on individual objects. Traditionally, the first component is called TBox and the second component is called ABox. A typical TBox assertion states that a concept represents a specialization of another concept. A typical ABox assertion is that a particular object is an instance of a certain concept.

The central aspect of our approach is to transform CBM inconsistency detection into a reasoning problem, and use OWL representation to leverage its underlying DL computation capability. In the DL, TBox is used to represent concepts, relationships and their subsumption hierarchies. ABox in the DL is used to represent instances of concepts and relationships.

Basically, there are two types of inconsistency problems. The first issue is consistency among CBM maps, which can be transformed into an ABox consistency issue. Suppose we have Retail industry map as an ABox A1, and enterprise map for Acme is another ABox A2, then we can use the DL inference engine to perform self-consistency validation on A3, which is the combination of A1 and A2.

Another issue is consistency among CBM maps and the CBM meta-model, which can be transformed into the consistency between TBox and its ABox instances. Suppose we have an enterprise map for Acme as an ABox A, and the CBM meta-model is the TBox T, then the DL inference engine can reason and verify if A comply with the definitions in T in a logical way.

Our approach has the following advantages:

OWL provides a sound and complete computational capability, which can guarantee the results of a consistency check.

An ontology is more meaningful and easier to understand for business people.

A semantic model-based consistency check will improve the correctness of various CBM-based qualitative business analyses, including the dependency analysis, heat map analysis, and overlay analysis.

Referring now to the drawings, and more particularly to FIG. 1, there is shown the overall working process of the inconsistency detection and corresponding information flow and control flow.

Semantic Constraints Generator 115 will take Semantic Model of CBM Meta-model 110 and Inconsistent Conditions of CBM Maps 125 as input, and generate a comprehensive set of Semantic Constraints 120 that are represented as a mixture of OWL expressions and OWL rule expressions. CBM Maps 130 that are produced by other CBM tools will be imported, and will be transformed to OWL facts by the OWL Facts Transformer 140, using the Semantic Model of CBM Meta-model 110. The result of this transformation is CBM Maps in OWL 145. Then the OWL Inference Engine 150 can take Semantic Constraints 120 and CBM Maps in OWL 145 as input, and verify those constraints on CBM maps by reasoning on the mixture of OWL expressions, OWL rule expressions and OWL facts. Then OWL Inference Engine 150 can generate Inconsistency Detection Result 160, which can be consumed by other tools 170. It should be noted that each of the tools 170 may have its own meta-model to describe CBM maps.

Figure 1A:
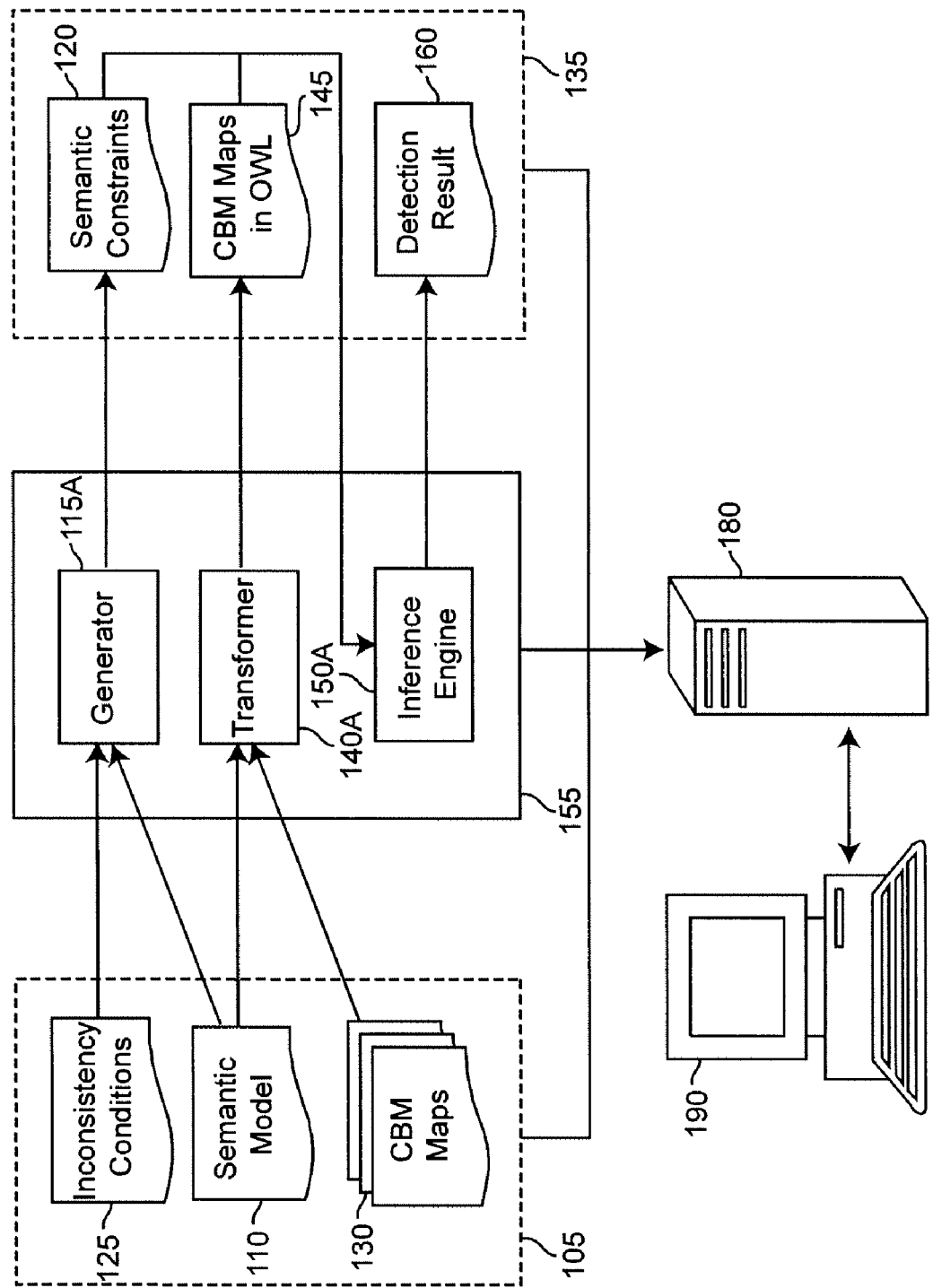
FIG. 1A is a schematic of a system implementing the invention described in FIG. 1.

FIG. 1A shows a system implementing the invention described in FIG. 1. Semantic Constraints Generator 115 is implemented in Generator computer program 115A, OWL Facts Transformer 140 is implemented in Transformer computer program 140A, and OWL Inference Engine 150 is implemented in Inference Engine computer program 150A. Inconsistency Conditions 125, Semantic Model 110, and CBM Maps 130 comprise the input data 105 for the computer programs 155 that implement the invention. These inputs are typically created by other programs (not shown). The computer programs 155 produce outputs 135, comprised of Semantic Constraints 120, CBM Maps in OWL 145 and Inconsistency Detection Result 160. The programs 155, inputs 105, and outputs 135 are stored on server 180, which is connected to monitor and keyboard assembly 190. Those skilled in the art will recognize that the implementation shown in FIG. 1A is an exemplar implementation on a standalone device, and that the operative functionality of programs 155 can be distributed in a variety of configurations over local area and wide area networks.

The following is a simple example to show how the entire system works step by step.

Semantic Model of CBM Meta-model

Here is a small portion of the semantic model of a CBM meta-model, in OWL.

```
<owl:Class rdf:about="&emp;BusinessComponent 220">
</owl:Class>
<owl:Class rdf:about="&emp;BusinessCompetency 240">
</owl:Class>
<owl:ObjectProperty rdf:about="&emp;competency">
    <rdfs:domain rdf:resource="&emp;BusinessComponent 220"/>
    <rdfs:range rdf:resource="&emp;BusinessCompetency 240"/>
</owl:ObjectProperty>
<owl:Class rdf:about="&emp;BusinessService 260">
</owl:Class>
<owl:ObjectProperty rdf:about="&emp;usedService">
    <rdfs:domain rdf:resource="&emp;BusinessComponent 220"/>
    <rdfs:range rdf:resource="&emp;BusinessService 260"/>
</owl:ObjectProperty>
<owl:Class rdf:about="&emp;AccountabilityLevel 210">
</owl:Class>
<owl:ObjectProperty rdf:about="&emp;accountabilityLevel">
    <rdfs:domain rdf:resource="&emp;BusinessComponent 220"/>
    <rdfs:range rdf:resource="&emp;AccountabilityLevel 210"/>
</owl:ObjectProperty>
```

Figure 2A:
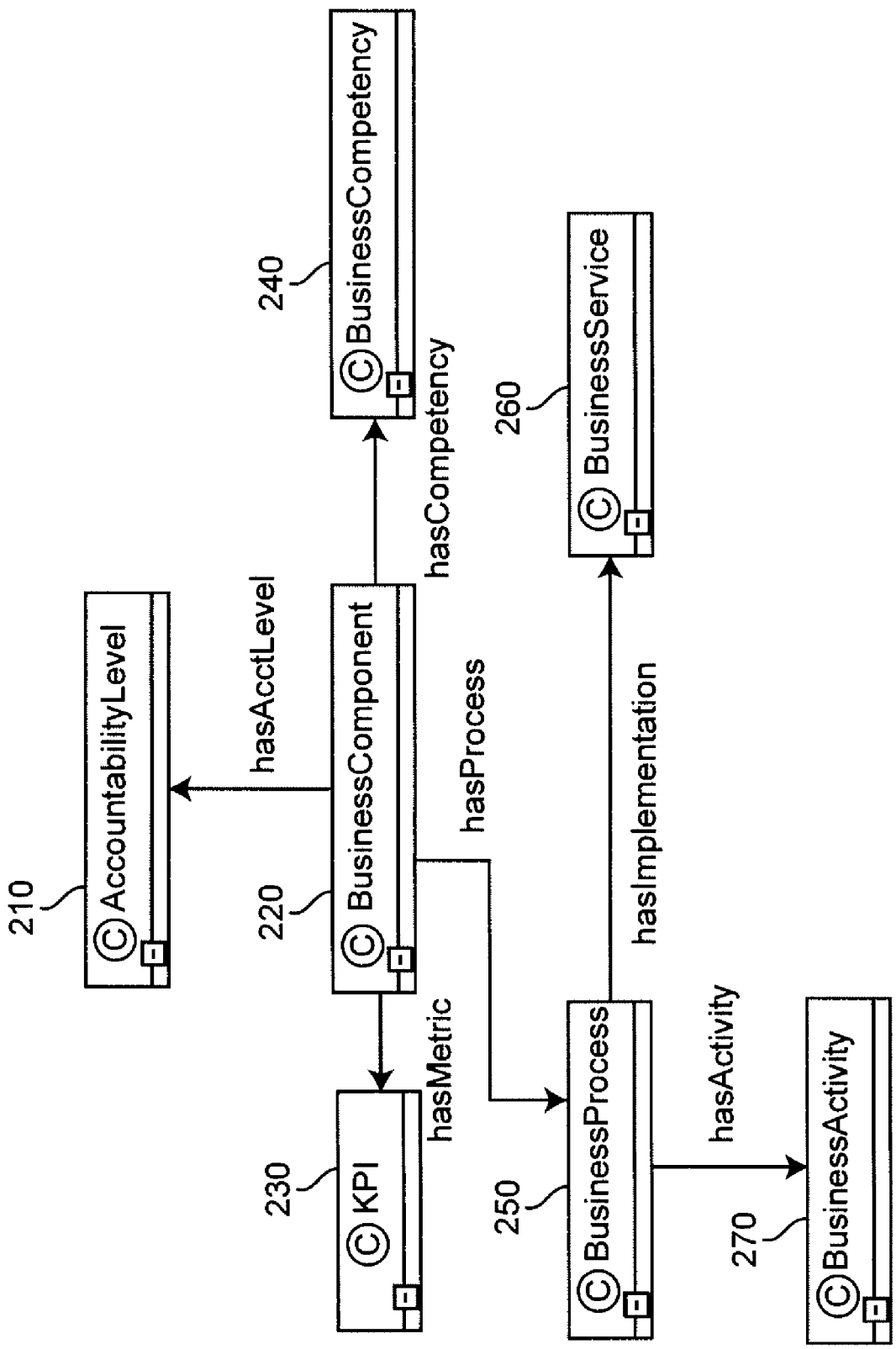
FIG. 2A is a diagram showing a semantic model of a fragment of a CBM meta-model.

FIG. 2A shows the graphical view of the above OWL fragment. Business Component 220 has an Accountability Level 210 and has a metric, shown as a key performance indicator (KPI 230). It also has a business competency 240. Business Component 220 also has a Business Process 250, which in turn has a Business Activity 270. Business Process 250 is implemented in a Business Service 260.

Figure 2B:
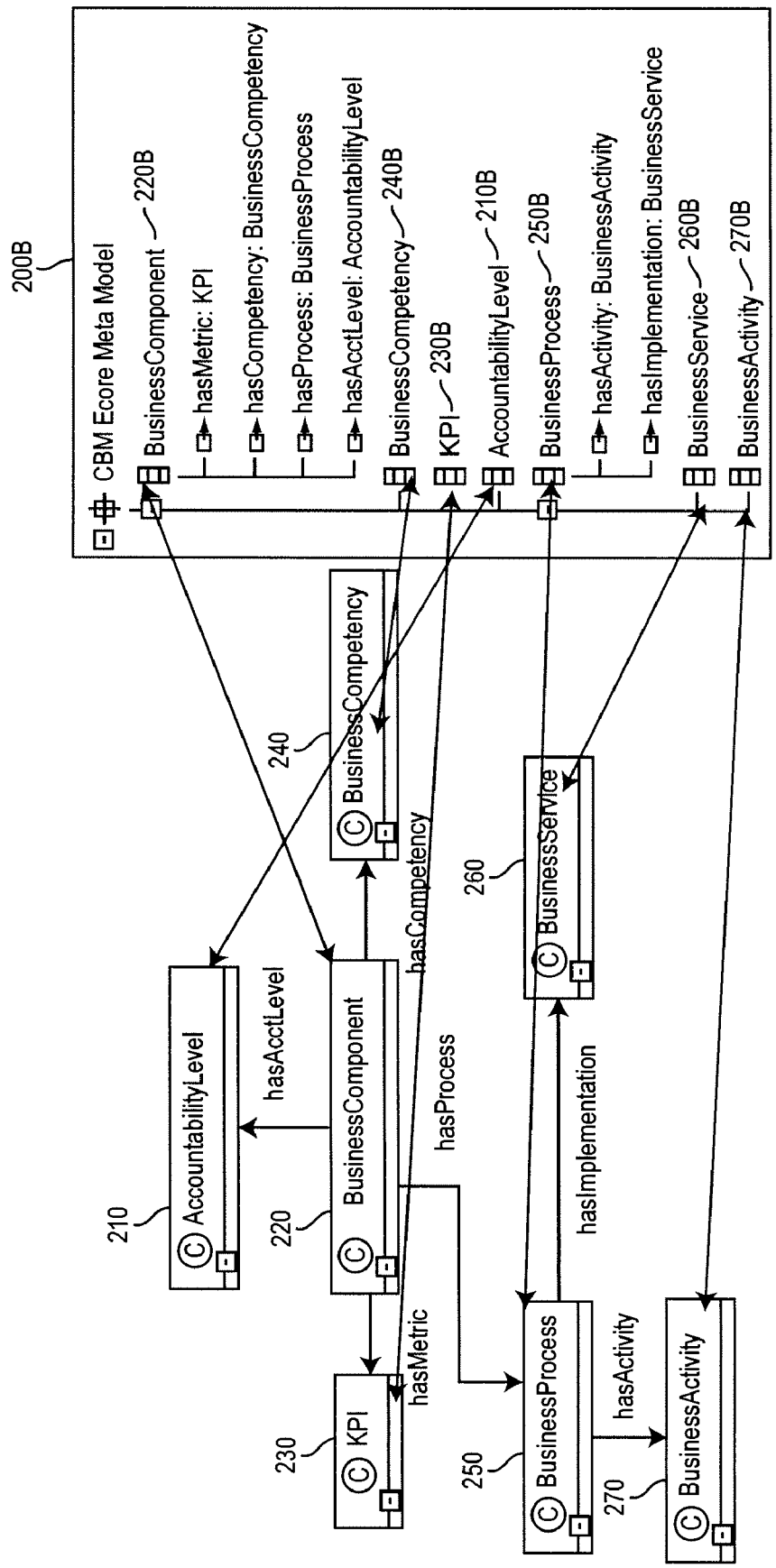
FIG. 2B is a diagram showing a mapping between the semantic model fragment of FIG. 2A and a representation of the fragment using the Ecore meta-model.

Returning to FIG. 1, OWL Facts Transformer 140 transforms CBM maps into OWL facts through mapping between OWL and other modeling languages that are used to describe CBM maps in other CBM tools 170. For example, Ecore is the meta-model included within the Eclipse Modeling Framework. If Ecore, rather than OWL, is used to represent the CBM meta-model, then the OWL Facts Transformer 140 uses a meta-model mapping between OWL and Ecore, as shown in FIG. 2B. Each of meta-model elements shown in FIG. 2A has a corresponding element in the Ecore meta-model 200B, as shown by the double-headed arrows in FIG. 2B: Accountability Level 210 maps to Accountability Level 210B, Business Component 220 maps to Business Component 220B, KPI 230 maps to KPI 230B, Business Competency 240 maps to Business Competency 240B, Business Process 250 maps to Business Process 250B, Business Service 260 maps to Business Service 260B, and Business Activity 270 maps to Business Activity 270B. Note that this is a one-to-one mapping that is operable in both directions. Therefore, given this mapping between Ecore and OWL, the OWL Facts Transformer 140 can transform CBM maps represented in Ecore into OWL representations.

Inconsistency Conditions of CBM Map

Suppose there are two simple inconsistency conditions that a CBM map should comply with. They cover two usage scenarios; (1) consistency between an industry map and an enterprise map, and (2) consistency between the CBM maps and the CBM meta-model.

Figure 3:
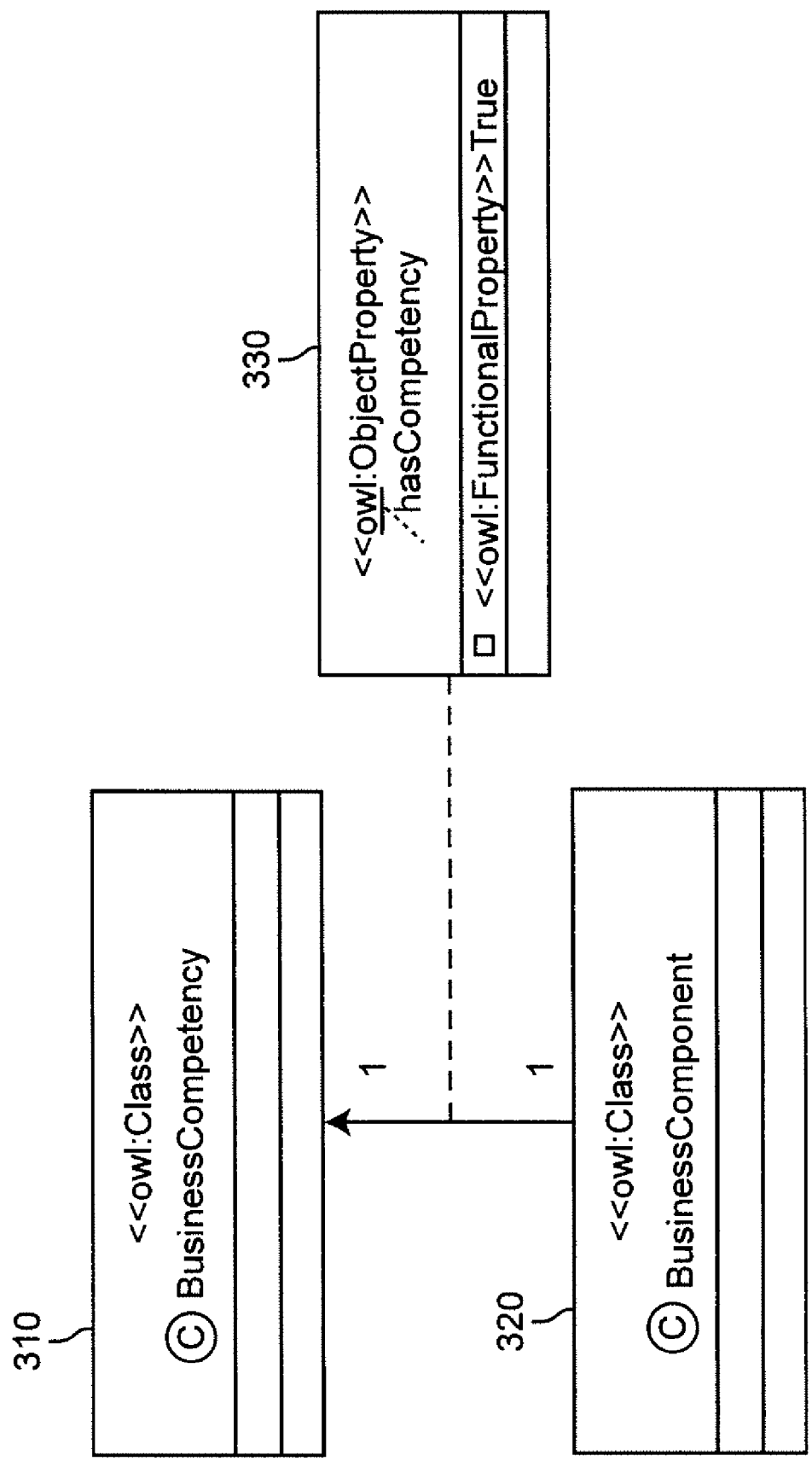
FIG. 3 is a diagram showing a meta-model representation of a "hasCompetency" definition.

Condition 1: As shown in FIG. 3 and the following OWL fragment, if business component c 320 has competency p 310 in an industry map, c 320 should also have competency p 310 in enterprise map. This is represented by an OWL object property 330.

```
<owl:ObjectProperty rdf:about="&emp;hasCompetency">
    <rdf:type rdf:resource= "&owl;FunctionalProperty"/>
        <rdfs:domain rdf:resource="&emp;BusinessComponent"/>
        <rdfs:range rdf:resource="&emp;BusinessCompetency"/>
</owl:ObjectProperty>
```

CBM Map in OWL

Figure 4:
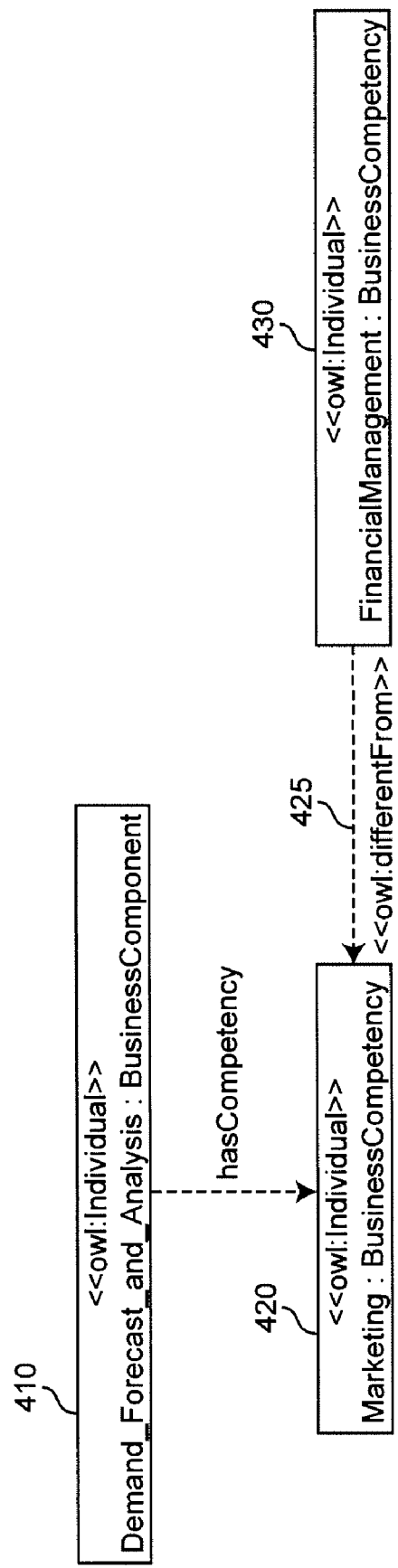
FIG. 4 is a diagram showing a CBM meta-model representation of a portion of a CBM retail industry map.

For the purposes of the following illustrations, we will consider ACME as an enterprise within the retail industry. As shown in FIG. 4 and the following OWL fragment, the Retail industry map will show that the business component "Demand_Forecast_and_Analysis" 410 has the Marketing business competency 420, the Marketing business competency 420 is different from (owl:differentFrom 425) the FinancialManagement business competency 430.

```
<BusinessComponent rdf:ID="&emp;Demand_Forecast_and_Analysis">
<hasCompetency>
    <BusinessCompetency rdf:ID="&emp;Marketing">
        <owl:differentFrom>
            <BusinessCompetency rdf:ID="&emp;FinancialManagement">
                <owl:differentFrom rdf:resource="&emp;Marketing"/>
            </BusinessCompetency>
        </owl:differentFrom>
    </BusinessCompetency>
</hasCompetency>
</BusinessComponent>
```

Figure 5:
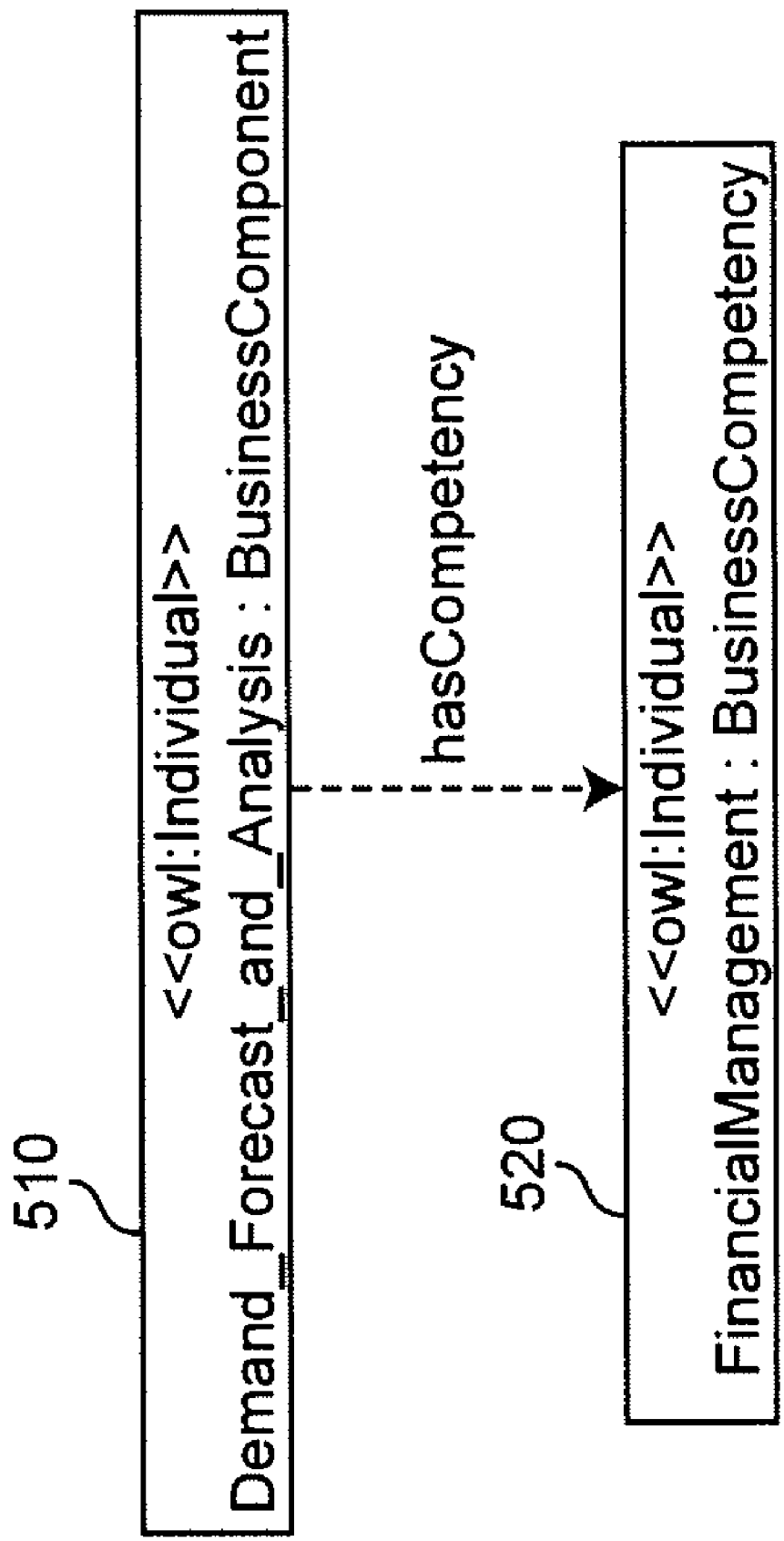
FIG. 5 is a diagram showing a graphical representation in OWL of a portion of a CBM map for a particular enterprise within the retail industry, corresponding to FIG. 4.

As shown in FIG. 5 and the following OWL fragment, however, the Acme enterprise map shows that the business component "Demand_Forecast_and_Analysis" 510 has the competency FinancialManagement 520.

```
<BusinessComponent rdf:ID="&emp;Demand_Forecast_and_Analysis">
    <hasCompetency>
        <BusinessCompetency rdf:ID="&emp; FinancialManagement "/>
    </hasCompetency>
</BusinessComponent>
```

OWL Inference Engine

The DL inference engine takes both the retail industry map and ACME enterprise map as input to populate its ABox instances. Because hasCompetency is a functional property, the DL reasoner can deduce that the FiancialManagement competency 520 is the same as (owl:sameAs) the Marketing competency 420. At the same time, these two competencies are declared as different from each other (owl:differentFrom 425). This generates a logic conflict under DL model theory.

Inconsistency Detection Result

The DL inference engine can tell that there is an inconsistency between the industry map (in this example, the Retail industry map) and the enterprise map (in this example, the ACME enterprise map) on the definition of the demand forecast and analysis component. Then a CBM tool (170 in FIG. 1) can read the detection result and take proper actions to remind the consultant.

Figure 6:
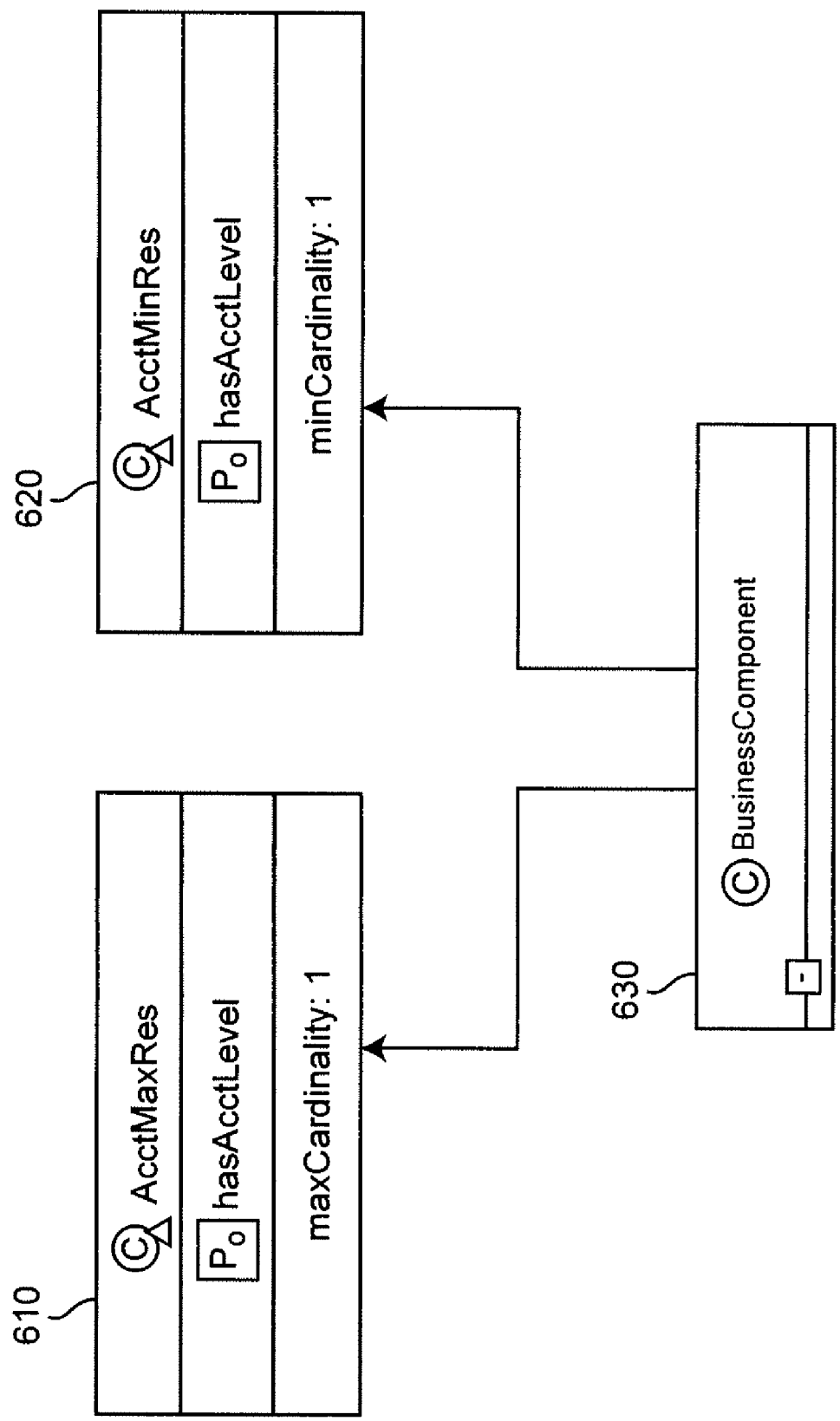
FIG. 6 is a diagram showing a graphical representation in OWL of semantic constraints on cardinality.

Condition 2: As shown in FIG. 6 and in the OWL fragment below, a business component c 630 has one and only one accountability level. This is represented in OWL as a maximum cardinality constraint 610 of one and a minimum cardinality constraint 620 of one.

```
<owl:Class rdf:about="&emp;BusinessComponent">
    <rdfs:subClassOf rdf:resource="&emp; AcctMaxRes "/>
    <rdfs:subClassOf rdf:resource="&emp; AcctMinRes "/>
</owl:Class>
<owl:Restriction rdf:about="&emp; AcctMaxRes ">
    <owl:onProperty rdf:resource="&emp;hasAcctLevel"/>
    <owl:maxCardinality>1</owl:maxCardinality>
</owl:Restriction>
<owl:Restriction rdf:about="&emp; AcctMinRes ">
    <owl:onProperty rdf:resource="&emp;hasAcctLevel"/>
    <owl:minCardinality>1</owl:minCardinality>
</owl:Restriction>
```

Returning to FIG. 1, the inconsistency conditions of CBM Maps 125 define the conditions that CBM maps should comply with, which will be tested by OWL Inference Engine 150. Each inconsistency condition can be decomposed as conjunctions or disjunctions of simple conditions. By defining a mapping between simple conditions and OWL restrictions, Semantic Constraints Generator 115 can transform inconsistency conditions 125 into OWL expressions.

For example, a condition "a business component should have one and only one accountability level" is a conjunction of two simple conditions: "a business component has at least one accountability level" and "a business component has one accountability level at most"; these simple conditions can be transformed to minCardinality restriction 620 and maxCardinality restrictions 610 in OWL, as shown in FIG. 6.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for exposing inconsistencies between related views in a component business model of a business, comprising:

generating two component business model (CBM) maps, a first map being a CBM map of the business and a second map being a CBM map of an industry group of which said business is a member, each map being a view of an enterprise, the industry group CBM map being generic to an enterprise in the industry group and the CBM map of the business representing an enterprise particularized to the business, each view showing components of the enterprise, said enterprise having assets, said assets being described by attributes, and said assets having been partitioned into non-overlapping parts, each said part including mechanisms for using said partition of assets to produce a commercially useful result, said mechanisms and associated assets being further partitioned into non-overlapping components, each said component producing a commercially useful result in the form of one or more services, each said service being usable by another component or by a customer of the enterprise, there being boundaries between said asset partitions and said components within said asset partitions, said boundaries being logical rather than physical, said components being grouped on said view into three accountability levels, each said component being assigned to one of said three levels, said components being arrayed in said visual display by asset partition and by accountability level, a component being assigned to a control level of accountability if the component provides policy and strategy for the business, a component being assigned to a direct level of accountability if the component implements policy and strategy by directing the activities of the business, and a component being assigned to an execute level of accountability if the component provides operational control;

determining inconsistency conditions applicable to said first and second CBM maps, said inconsistency conditions including identifying for each component one of said accountability levels and one of said asset partitions;

decomposing each said inconsistency condition into a conjunction or disjunction of simple conditions;

define a mapping between said simple conditions and restrictions in a Web ontology language;

using a semantic model of a CBM meta-model to transform said first and second CBM maps into corresponding statements in said Web ontology language; and inferring from said restrictions and statements in said Web ontology language a detection result identifying components having inconsistent identifications of accountability level or asset partition between said first and second CBM maps.

* * * * *